UNITED STATES PATENT OFFICE.

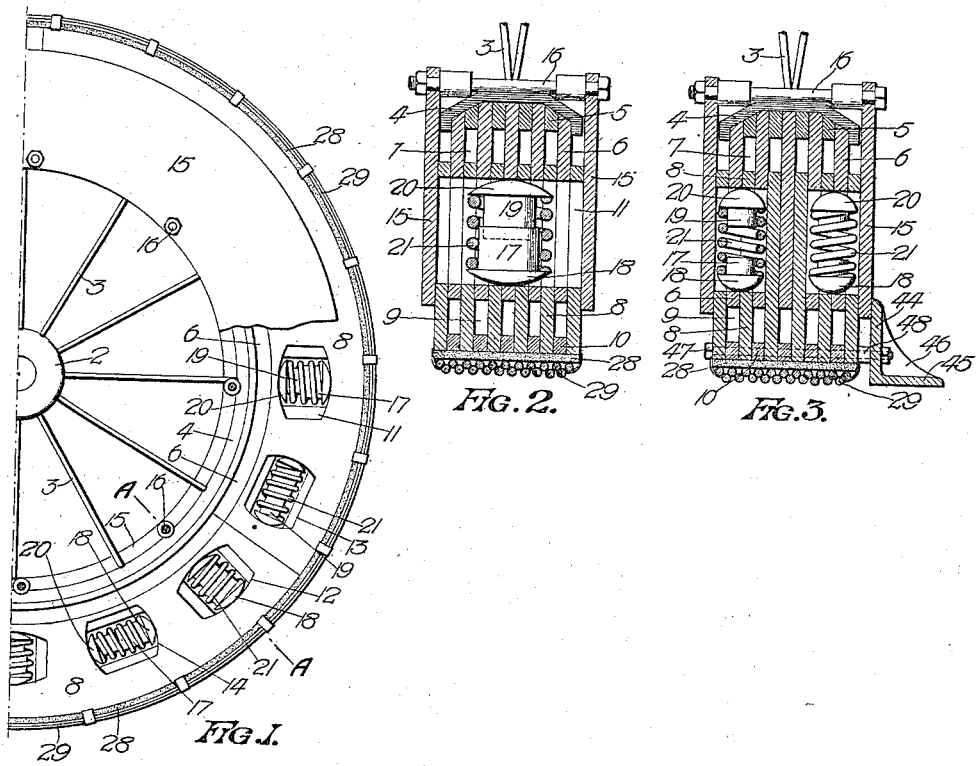

GUSTAV KANTER, OF ESSENDON, MELBOURNE, VICTORIA, AUSTRALIA.

RESILIENT TIRE FOR VEHICLE-WHEELS.

1,209,592.  Specification of Letters Patent.  Patented Dec. 19, 1916.

Application filed April 22, 1914. Serial No. 833,734.

*To all whom it may concern:*

Be it known that I, GUSTAV KANTER, a subject of the King of Great Britain and Ireland, and a resident of the post town of Moonee Ponds, a district of the city of Essendon, a suburb of the city of Melbourne, in the county of Bourke, State of Victoria, Commonwealth of Australia (whose post-office address is Zoppot Villa, 5 Heritage street, in the said post town of Moonee Ponds), have invented certain new and useful Improvements in Resilient Tires for Vehicle-Wheels, of which the following is a specification.

This invention relates to resilient devices for use in lieu of pneumatic tires.

Hitherto many suggestions have been made with the object of providing a less costly and less troublesome means than the pneumatic tire for absorbing the shocks resulting from road inequalities. Various spring combinations have been proposed to this end but these have often been unreliable or costly and have not usually been capable of replacing or being substituted for the tire upon the ordinary wheel. On sandy and loose unmade tracks it is not uncommon for a vehicle to be incapable of proceeding. This is generally owing to the tires being too narrow.

The object of this invention is to provide a resilient tire for vehicle wheels adapted to suitably provide for the suspension of the vehicle load and the distribution of road shocks around the whole periphery of the wheel instead of at the point of contact only.

Referring to the drawings which form a part of this specification, Figure 1 is a side view of one half of a wheel according to this invention portion of a circumferential side plate being broken away for convenience of illustration. Fig. 2 is an enlarged sectional view of a wheel, on line A—A, Fig. 1. Fig. 3 is an enlarged sectional view of the wheel showing a modified arrangement of springs and the means employed to increase the tire width when traveling over sand and the like.

The wheel comprises a central hub 2, provided with a series of radial spokes 3, carrying a rim 4, of any suitable construction. Around the rim 4 is a series of inner circumferential split rings 5, between which are disposed the inner ends of a second series of circumferential plates 6, the split rings 5 forming spacing members between the said plates 6, whereby to form a series of circumferential spaces 7. Encircling the split rings 5 and disposed within the spaces 7 is a further series of circumferential plates 8, having formed between them a series of circumferential spaces 9, into which the plates 6 project. At the outer edges of the plates 8 is a series of outer circumferential rings 10, which are held within the spaces 9. The plates 6 and 8 are formed in sections so that they may be readily placed around the rim 4, and then clamped or otherwise suitably secured in position.

Formed through the plates 6 and 8 are a plurality of corresponding radial apertures 11, each provided with an inner and outer curved side 12, and the plates 6 and 8 are further formed with a series of tangential apertures 13, each having its ends curved as at 14. The holes 11 and 13 in the plates 6 may be smaller in size than the corresponding holes in the plates 8, by means of which the plates 8 may slide in relation to the plates 6, without displacing the springs, as hereinafter described.

Two circumferential side plates 15—15 are shown as secured upon the rim 4, by means of a series of bolts 16. Within each of the apertures 11 and 13 is a telescopic spring keeper member comprising a first member 17 having a curved head 18 and a second member 19, telescoping within the first member 17, and having a curved head 20. These curved heads engage the curved sides or ends, as the case may be, of the apertures 11 and 13. Encircling the members of each spring keeper member and engaging the heads 18 and 20 thereof is a helical spring 21.

Encircling the outer circumferential rings 10, is a circumferential pad 28, and around the pad 28 is disposed a series of wire tread rings 29 secured therein in any suitable manner.

In the modification as shown in Fig. 3, instead of the center plates 6 and the two plates 8 sliding against the same having spring apertures 11 and 13 formed therein, the said apertures are dispensed with, the plates thereby being divided into two distinct series, as shown, and the spring keeper members and the springs are duplicated.

In this figure the spring keeper members are shown as not being telescopic so that any lateral movement of the two members 19 and 17 is prevented by the confinement of the springs within the spaces formed between the circumferential side plates 15 and the plate 8.

In Fig. 3, an auxiliary tread plate comprising a vertical flange 44, having a traction member 45 integral therewith and provided with strengthening ribs 46, is shown as supported in place by means of plates 47 passing through the flange 44 and through the plates 8 and 10, and spaced therefrom by means of washers 48.

The operation of the tire is as follows: Should any road unequality be encountered by the wheel, the outer circumferential rings 10 and the plates 8 will move inwardly, thus compressing the members 17 and 19, and the spring 21 carried thereby, the plates distributing the shock evenly around the whole of the wheel, thus compressing each individual spring and distributing the shock and maintaining the hub and circumferential plates concentric, the shock being absorbed not only by the springs within the radial apertures 11, but also by the springs within the tensioning apertures 13, by means of which the shock is distributed, as above stated.

What I claim as new and desire to secure by Letters Patent is:—

1. A resilient tire for vehicle wheels comprising in combination a wheel rim, a series of circumferential plates adjacent said rim provided with a plurality of radial and tangential spring apertures and having spaces therebetween, a second series of plates adapted to alternately engage said first named series and having a plurality of radial and tangential spring apertures therein and a plurality of radial and tangential springs disposed within said apertures.

2. A resilient tire for vehicle wheels comprising in combination a wheel rim, a series of inner circumferential split rings, a series of circumferential plates separated by said rings, a second series of circumferential plates adapted to move between the first series, a series of outer circumferential rings alternately disposed between the plates of the second series, the first and second series of plates having formed therein a series of radial spring apertures provided with curved ends, a spring disposed within each radial aperture and provided with curved bearing members adapted to fit the curved ends of said apertures, said first and second series of plates having a series of tangential spring apertures provided with curved ends, a spring disposed within each tangential aperture and provided with curved bearing members adapted to fit the curved ends of said apertures.

In testimony whereof I have hereunto affixed my signature in the presence of two subscribing witnesses.

GUSTAV KANTER.

Witnesses:
CECIL W. LE PLASTREU,
GEORGE A. M'REN.

Copies of this patent may be obtained for five cents each, by addressing the "Commissioner of Patents, Washington, D. C."